United States Patent
Laxhuber

(10) Patent No.: US 8,757,331 B2
(45) Date of Patent: Jun. 24, 2014

(54) BRAKE SYSTEM FOR USING THE AIR RESISTANCE OF A VEHICLE TO PRODUCE ENERGY

(75) Inventor: Ludwig Laxhuber, Herrsching (DE)

(73) Assignee: Forstgarten Holding GmbH, Oesterreich (AT)

( * ) Notice: Subject to any disclaimer, the term of this patent is extended or adjusted under 35 U.S.C. 154(b) by 531 days.

(21) Appl. No.: 13/001,344

(22) PCT Filed: Jun. 26, 2009

(86) PCT No.: PCT/EP2009/004645
§ 371 (c)(1),
(2), (4) Date: Mar. 24, 2011

(87) PCT Pub. No.: WO2009/156177
PCT Pub. Date: Dec. 30, 2009

(65) Prior Publication Data
US 2011/0162924 A1    Jul. 7, 2011

(30) Foreign Application Priority Data

Jun. 26, 2008   (EP) .................................... 08011617

(51) Int. Cl.
*B60T 11/10* (2006.01)
(52) U.S. Cl.
USPC .............. 188/155; 290/40 C; 290/44; 290/55; 180/65.31
(58) Field of Classification Search
USPC .......... 188/155, 158; 290/40 C, 40 R, 43, 44, 290/54, 55; 180/65.1, 65.285, 65.31
See application file for complete search history.

(56) References Cited

U.S. PATENT DOCUMENTS

| | | | |
|---|---|---|---|
| 3,556,239 A | | 1/1971 | Spahn |
| 3,621,930 A | * | 11/1971 | Dutchak ................... 180/65.31 |
| 4,254,843 A | | 3/1981 | Han |
| 4,632,205 A | | 12/1986 | Lewis |
| 5,280,827 A | | 1/1994 | Taylor |
| 5,386,146 A | | 1/1995 | Hickey |
| 5,680,032 A | * | 10/1997 | Pena .............................. 290/52 |
| 7,468,562 B1 | * | 12/2008 | Barbic ........................ 290/40 C |
| 2007/0262584 A1 | | 11/2007 | Lu |
| 2007/0262585 A1 | | 11/2007 | Rendell |

FOREIGN PATENT DOCUMENTS

WO   WO 2006/024208    3/2006

OTHER PUBLICATIONS

International Search Report, issued Sep. 29, 2009, for PCT International Application No. PCT/EP2009/004645.
Written Opinion, issued Sep. 29, 2009, for PCT International Application No. PCT/EP2009/004645.

* cited by examiner

*Primary Examiner* — Pamela Rodriguez
(74) *Attorney, Agent, or Firm* — Pearl Cohen Zedek Latzer Baratz LLP

(57) ABSTRACT

An air brake system and methods of using the same are described. The air brake system has an air intake port having an open position and closed position controlled by control unit linked to a gas pedal and brake pedal such that, upon braking, air is allowed into the intake port through a guiding channel to power a fan and increase air resistance for braking the car. The fan is linked to a generator for converting the rotational energy of the fan into electrical energy.

12 Claims, 2 Drawing Sheets

BRAKE SYSTEM FOR USING THE AIR RESISTANCE OF A VEHICLE TO PRODUCE ENERGY

CROSS-REFERENCE TO RELATED APPLICATIONS

This application is a National Phase Application of PCT International Application No. PCT/EP2009/004645, entitled "BRAKE SYSTEM FOR USING THE AIR RESISTANCE OF A VEHICLE TO PRODUCE ENERGY," International Filing Date, Jun. 26, 2009, published on Dec. 30, 2009 as International Publication No. WO 2009/156177, which in turn claims priority from European Patent Application No. 08011617.1, filed Jun. 26, 2008, both of which are incorporated herein by reference in their entirety.

FIELD OF THE INVENTION

The present invention relates to a system for using the air resistance of a vehicle, in particular a car, to effect a braking force to act on the vehicle.

BACKGROUND OF THE INVENTION

A moving vehicle constantly is being decelerated by the air resistance acting thereon. Thus, in order to overcome this constant deceleration the vehicle constantly consumes energy. There have been attempts to use the air resistance acting on a vehicle for actively decelerating the vehicle or for transforming the energy of the air stream passing the moving vehicle into a usable form of energy that can be stored and used by the vehicle.

For instance, WO 2006/024208 discloses an aerodynamic auxiliary braking apparatus for a motor vehicle. The roof of the vehicle is configured as a main air resistance plate. The plate is hinged to a corresponding part of the vehicle body.

Concerning the transformation into a useable form of energy U.S. Pat. No. 4,254,843 discloses an electrically powered vehicle having a bank of batteries supplying electricity to an electric motor driving wheels of the vehicle including a whirl ventilator system, a clutch system and an automatically operated, engine-generator unit for recharging the batteries. The whirl ventilator system includes housings to produce a whirling air flow rotating a fan to drive an alternator such that air flow from movement of the vehicle generates electricity to charge the batteries. The clutch system includes a clutch mechanism coupling a drive shaft and a driven shaft to impart a driving force to the wheels when the drive shaft is rotated faster than the driven shaft and to couple the driven shaft with a flywheel when the driven shaft is rotating faster than the drive shaft, the flywheel driving an alternator such that momentum of the vehicle causes the alternator to charge the batteries. The automatically operated, engine-generator unit is started to charge the batteries when the level of charge therein has dropped below a predetermined level and stopped when the charge level reaches a second predetermined level.

U.S. Pat. No. 5,280,827 discloses an electric motor-driven vehicle having a large wind turbine mounted at the rear of the vehicle that rotates about an axis perpendicular to the axis of the vehicle body. A long venturi tube extends along the upper portion of the vehicle above the passenger cab and directs air flow from the front of the vehicle and impinges it upon an upper portion of the turbine blades. A pair of elongated lower screw-type turbines are contained in separate lower venturi effect tubes extending along the lower side of the vehicle below the passenger cab. Air from the lower venturi effect tubes is impinged upon the large turbine in a direction and at a location to increase the force generated from the upper venturi tube. The turbines drive one or more electric power generators coupled to storage batteries for recharging the batteries.

U.S. Pat. No. 5,386,146 discloses an in-line fluid medium driven charging system including a fluid medium driven generator disposed in a fluid medium directing tube. The fluid medium driven generator includes an auger shaped, fluid medium engaging member and is coupled to an electrical generator. Rotation of the auger shaped, fluid medium engaging member by intercepting a flow of a fluid medium causes rotation of the electrical generator, thereby generating electrical energy which recharges and assists in maintaining the life of a battery in a moving vehicle.

SUMMARY OF THE INVENTION

According to a first aspect of the invention an air brake system is provided for using the air resistance acting on a vehicle, preferably a car, to produce energy and for simultaneously braking the vehicle. The air brake system comprises an air intake port having an open and a closed position. The air intake port can be arranged on the car grille, the sides of the car or any other suitable location on the car. The air intake port is connected to an air guiding channel disposed inside of the car, preferably in the hood compartment or engine bay thereof. The air entering the air intake port in its open position and being guided through the air guiding channel acts on energy conversion means being configured to convert the kinetic energy of the moving air into a different usable form of energy. Preferably, the energy conversion means comprise a rotatable fan and a generator. The fan is arranged inside of the air guiding channel so that air entering the air intake port in its open position and being guided through the air guiding channel passes by the fan and causes a rotating motion thereof. The fan is operatively connected to the generator for converting the rotational energy of the fan and, thus, ultimately the energy of the air entering via the air intake port in its open position and moving through the car via the air guiding channel into electric energy, which can be stored, for instance, by a battery of the car.

The inventive air brake system, thus, provides for the advantage that in addition to using an increased air resistance for braking a car this braking action is producing energy that can be re-used by the car.

Preferably, the inventive air brake system is installed in a car as a supplement to a conventional brake system, such as a brake-by-wire system acting directly on the wheels of the car. In such an embodiment both the air brake system according to the present invention and the conventional brake system can be controlled by a common control unit. The control unit preferably is so configured that the air brake system according to the present invention is activated by slightly tapping on the brake pedal, whereas such a slight tapping on the brake pedal does not activate the conventional brake system. Only if the braking caused by the air brake system according to the present invention alone is not sufficient for effecting the necessary braking force, then the conventional brake system can be activated by using the brake pedal in the usual way for providing the additional braking force. In this case both the air brake system according to the present invention and a conventional brake system will be in operation. Releasing the brake pedal causes the conventional brake system to release the brakes acting on the wheels of the car. Preferably, however, the air brake system according to the present invention is still operating, i.e. the air intake port is still in its open position. A slight tapping onto the gas pedal will release the air brake system according to the present invention by closing the air intake port, so that no more air can enter the car via the air intake port and, thus, the air resistance acting on the car is decreased.

Advantageously, the air brake system according to the present invention provides for an additional braking force in addition to a conventional brake system acting on the wheels of the car and, thus, a higher security. Moreover, the conventional brake system acting on the car wheels will be exposed to less wear, because in some instances the air brake system according to the present invention will be sufficient to provide for the necessary braking force. Finally, the energy of the air being directed through the car during operation of the air brake system according to the present invention can be stored and re-used resulting in less energy consumption of the vehicle.

Further preferred embodiments of the above described air brake system are defined in the additional dependent claims.

DETAILED DESCRIPTION OF PREFERRED EMBODIMENTS

The present invention will now be further described by defining different aspects of the invention generally outlined above in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
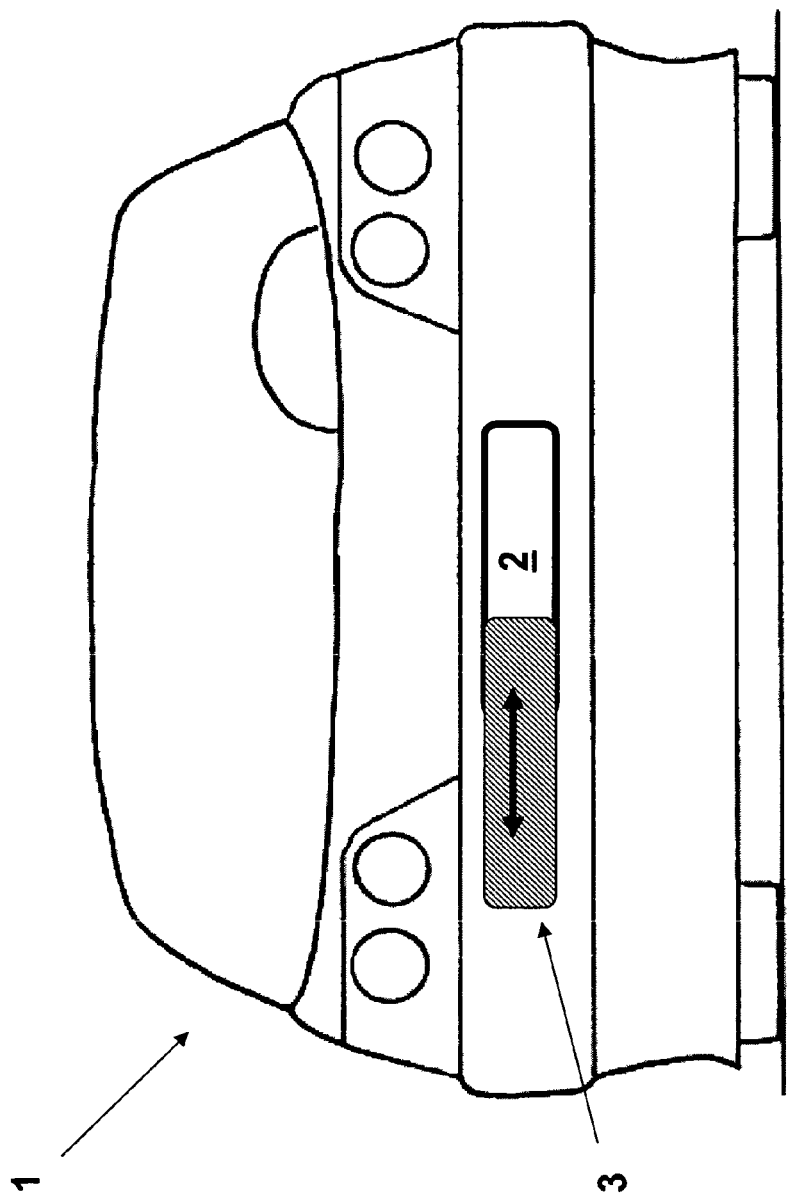
FIG. 1 shows schematically a front view of a car comprising the air brake system according to the present invention.

FIG. 1 shows a conventional car 1 being equipped with an air brake system according to the present invention. The air brake system according to the present invention comprises an air intake port 2, which in FIG. 1 is located on the grille of the car 1 and has an open position and a closed position. In the embodiment shown in FIG. 1 the air intake port 2 can be opened and closed by means of a movable cover plate 3. As indicated by the arrow in FIG. 1, the cover plate 3 can be linearly moved, for instance, by means of a linear motor such that it completely covers the air intake port 2 (i.e. the closed position of the air intake port 2 corresponding to the extended position of the cover plate 3) or the air intake port 2 is not covered at all by the cover plate 3 (i.e. the open position of the air intake port 2 corresponding to the retracted position of the cover plate 3). In FIG. 1 the cover plate 3 is in an intermediate position, wherein the air intake port 2 is half-open. Because in the open position of the air intake port 2 a portion of the air passing by the car 1, when it is moving, enters the air intake port 2 the drag coefficient of the car 1 is increased. In other words, for a given velocity the car 1 will experience in comparison to the closed position of the air intake port 2 an increased air resistance, i.e. a stronger braking force, with the air intake port 2 in its open position.

The person skilled in the art will appreciate that the exact location of the air intake port 2 and, thus, the movable cover plate 3 as well as the exact shapes of these elements is not important as long as the air intake port 2 can obtain a closed and an open position to sufficiently adjust the drag coefficient of the car 1. Moreover, it is contemplated that the air intake port 2 could be configured as a closable flap so that in such an embodiment the movable cover plate 3 would not be necessary.

Figure 2:
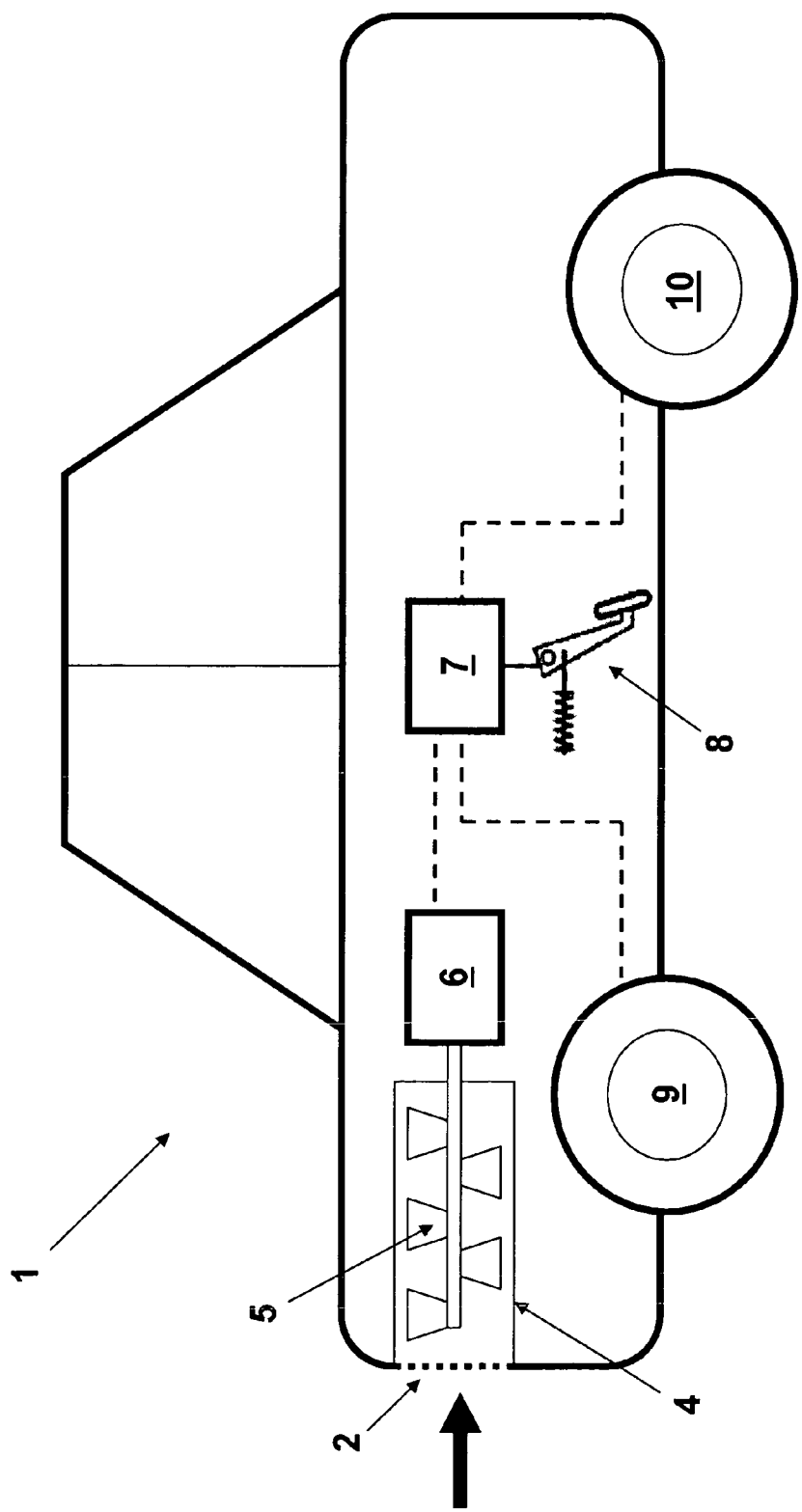
FIG. 2 shows a schematic view from one side of the car of FIG. 1 comprising the air brake system according to the present invention.

In FIG. 2 further components of the air brake system according to the present invention are shown. The air intake port 2 (shown in the open position in FIG. 2; cover plate 3 not shown) leads to an air guiding channel 4 for guiding the air entering the air intake port 2, indicated by the large arrow, through the hood compartment of the moving car 1. Inside of the air guiding channel 4 a fan 5 is located which is caused to rotate about its shaft by the air being guided through the air guiding channel 4. One end of the shaft of the fan 5 is connected to a generator 6 for converting the rotational energy of the fan 5 into electrical energy (or any other suitable kind of energy form). This electrical energy can be supplied to a battery (not shown) and stored therein. The person skilled in the art, however, will appreciate that energy conversion means different to the above fan and generator can be employed for converting the kinetic energy of the moving air into another usable form of energy.

The air guiding channel 4 preferably extends through the whole car 1 and disposes the air being guided therethrough via an air exit port (not shown). It is conceivable that not only one air intake port 2, but several ones lead into the air guiding channel 4, each being equipped with a separate cover plate 3. Moreover, if desired, also more than one fan 5 can be installed in the air guiding channel(s) 4. The person skilled in the art will appreciate that the location of the air exit port on the car will have an effect on how efficiently the air is guided from the air intake port 2 via the air guiding channel 4 to the air exit port. Preferably, the air exit port should be located in the floor or the sides of the car. However, other locations on the car, such as the back of the car, are also possible.

The position of the air intake port 2 and its cooperation with the cover plate 3, as shown and described, is only exemplary. According to the principles of the present invention the air intake port 2 could be alternatively or additionally arranged above the wind shield of the car 1, an outside mirror of the car and/or at other suitable locations of the car. Moreover, the cover plate 3 could be configured as a rotary flap. All these configurations are intended to fall within the scope of the present invention, as defined by the claims.

Preferably, the air brake system according to the present invention further comprises a control unit 7 for controlling the operation of the different components thereof. For instance, the control unit 7 is configured to effect opening and closing of the air intake port 2 by moving the cover plate 3 accordingly. Preferably, the air brake system according to the present invention supplements a conventional brake system, such as a brake-by-wire system acting directly on the wheels 9 and 10 of the car 1. It is contemplated that also the conventional brake system can be controlled by means of the control unit 7. To this end, the control unit 7 is operatively connected to a conventional brake pedal 8 in manner well-known to the person skilled in the art.

In a preferred embodiment the air brake system according to the present invention preferably is activated by means of a slight tapping on the brake pedal 8. In other words, if the control unit 7 senses an actuation of the brake pedal 8 within a certain predetermined air brake range, then it will cause the air intake port 2 to be opened by moving the cover plate 3 into its retracted position. Such an actuation of the brake pedal 8 within the predetermined air brake range will not cause the control unit 7 to trigger the conventional brakes interacting with the wheels 9 and 10. Such a slight braking could be sufficient, for instance, in a situation where the distance to a car in front is to be reduced only gradually or to reduce the increase of speed in case of a downhill slope. A further slight tapping on the brake pedal 8 preferably leads to a deactivation of the air brake system according to the present invention.

Only in case the braking force and the resulting deceleration provided by the air brake system according to the present invention are not sufficient for effecting the necessary deceleration of the car 1, then the conventional brake system is activated by moving the brake pedal 8 beyond the predetermined air brake range for providing an additional braking force caused by the interaction of the conventional brakes with the wheels 9 and 10. In this case both the air brake system according to the present invention and the conventional brake system will be in operation, i.e. each providing a portion of the total deceleration acting on the car 1.

Releasing the brake pedal 8 causes the conventional brake system to release the brakes acting on the wheels 9 and 10 of the car 1. Preferably, however, the air brake system according to the present invention is still operating, i.e. the air intake port 2 is still in its open position. A further slight tapping onto the brake pedal 8 will release the air brake system according to the present invention by closing the air intake port 2, so that no more air can enter the car 1 via the air intake port 2 resulting in a decrease of the drag coefficient of the vehicle and, thus, a smaller air resistance acting on the car 1 and, therefore, relieving the conventional brake system. Alternatively or additionally, it is conceivable that a slight tapping on the gas pedal releases the air brake system.

According to a preferred embodiment of the present invention a small air stream acts constantly on the fan 5 within the air guiding channel 4, when the car 1 is moving, both in the activated and the deactivated state of the air brake system according to the present invention. This can be achieved, for instance, by connecting the air guiding channel 4 to a further small air intake port being constantly open and located, for instance, on the side of the car. As the person skilled in the art will appreciate, the constant motion of air along the sides of the car and over the small air intake port will lead to a reduced air pressure outside of the small air intake port so that air will be sucked into the small air intake port. The air, thus, constantly entering the small air intake port joins the air guiding channel 4 downstream of the fan 5. This will result in a further suction force acting on the air located upstream of the point where the air entering the small intake port enters the air guiding channel 4 and, thus, a downstream movement of this air in the direction of the air exit port. This configuration has the advantage that the fan 5 is never at rest so that, when the air brake system according to the present invention is activated, the additional air entering into the air guiding channel 4 via the completely opened air intake port 2 acts on the fan 5 being already in rotary motion. This leads to a more efficient conversion of the kinetic energy of the air moving through the air guiding channel 4 and acting on the fan 5 into kinetic energy of the fan 5 and, thus, finally electric energy to be stored in the battery 6.

The present invention as described in detail above is not limited to the particular devices, uses and methodology described as these may vary. For instance, the person skilled in the art will appreciate that although the air brake system according to the present invention has been described above in the context of a car, the present invention, in principle, can be advantageously applied to any vehicle moving through a gaseous environment, such as trains, trucks, buses, airplanes, rockets, motorcycles and the like.

It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

The invention claimed is:

1. An air brake system for using the air resistance of a vehicle to produce energy and for simultaneously braking the vehicle, the system comprising:
    at least one air intake port having an open and a closed position;
    at least one air guiding channel connected to the air intake port;
    energy conversion means being configured so that air entering the air intake port in its open position and being guided through the air guiding channel acts on the energy conversion means to convert the kinetic energy of the air into a different, useable form of energy;
    at least one fan arranged inside the air guiding channel and being configured so that air entering the air intake port in its open position and being guided through the air guiding channel passes by the fan and causes a rotating motion thereof; and
    a generator being operatively connected to the at least one fan for converting the rotation energy of the at least one fan into electric energy;
    wherein the at least one air guiding channel is connected to a further small intake port configured to be constantly open that joins the air guiding channel downstream of the at least one fan such that a small air stream acts constantly on the at least one fan within the air guiding channel, when the vehicle is moving.

2. The air brake system according to claim 1 wherein the air intake port is configured as a moveable cover plate.

3. The air brake system of claim 1 wherein the air intake port is configured as a pivotable flap.

4. A vehicle comprising:
    a plurality of wheels, a brake pedal and a gas pedal;
    a conventional brake system acting directly on at least one of the plurality of wheels of the vehicle; and
    an air brake system comprising:
        at least one air intake port having an open and a closed position;
        at least one air guiding channel connected to the air intake port;
        energy conversion means being configured so that air entering the air intake port in its open position and being guided through the air guiding channel acts on the energy conversion means to convert the kinetic energy of the air into a different, useable form of energy;
        at least one fan arranged inside the air guiding channel and being configured so that air entering the air intake port in its open position and being guided through the air guiding channel passes by the fan and causes a rotating motion thereof; and a generator being operatively connected to the at least one fan for converting the rotation energy of the at least one fan into electric energy;

wherein the at least one air guiding channel is connected to a further small intake port configured to be constantly open that joins the air guiding channel downstream of the at least one fan such that a small air stream acts constantly on the at least one fan within the air guiding channel, when the vehicle is moving.

5. The vehicle according to claim 4, wherein the air brake system further comprises a control unit for controlling both the air brake system and the conventional brake system.

6. The vehicle of claim 5 wherein the control unit in the closed position of the air intake port is configured to open the air intake port by actuating the brake pedal within a predetermined air brake range.

7. The vehicle according to claim 5 wherein the control unit in the closed position of the air intake port is configured to open the air intake port and to activate the conventional brake system by actuating the brake pedal beyond a predetermined air brake range.

8. The vehicle according to claim 7 wherein the control unit is further configured to deactivate the conventional brake system by releasing the brake pedal from beyond the predetermined air brake range.

9. The vehicle according to claim 8 wherein the control unit in the open position of the air intake port is configured to close the air intake port by actuating the gas pedal within the predetermined air brake range.

10. The vehicle according to claim 4 wherein the vehicle has at least one of the group consisting of sides and a grille and the air intake port is arranged on the grille or the sides of the vehicle.

11. The vehicle according to claim 4 wherein the vehicle has at least one of the group consisting of a hood compartment or engine bay and the guiding channel is disposed in the hood compartment or engine bay of the vehicle.

12. A method of operating a vehicle comprising the steps of:

providing a vehicle comprising:
  a plurality of wheels;
  a conventional brake system acting directly on at least one of the plurality of wheels of the vehicle; and
  an air brake system comprising:
    at least one air intake port having an open and a closed position;
    at least one air guiding channel connected to the air intake port;
    energy conversion means being configured so that air entering the air intake port in its open position and being guided through the air guiding channel acts on the energy conversion means to convert the kinetic energy of the air into a different, useable form of energy;
    at least one fan arranged inside the air guiding channel and being configured so that air entering the air intake port in its open position and being guided through the air guiding channel passes by the fan and causes a rotating motion thereof; and
    a generator being operatively connected to the at least one fan for converting the rotation energy of the at least one fan into electric energy;
    wherein the at least one air guiding channel is connected to a further small intake port configured to be constantly open that joins the air guiding channel downstream of the at least one fan such that a small air stream acts constantly on the at least one fan within the air guiding channel, when the vehicle is moving; and operating the vehicle such that air entering the air intake port in the open position flows through the air guiding channel and is received by the energy conversion means to convert kinetic energy into a different, useable form of energy.

* * * * *